MASK GENERATING CIRCUIT

Filed Dec. 30, 1964

3 Sheets-Sheet 1

INVENTORS B. T. FOUGHT
W. B. MACURDY
D. MUIR III
BY
Charles Scott Phelan
ATTORNEY Nov. 7, 1967 B. T. FOUGHT ET AL 3,351,915

MASK GENERATING CIRCUIT

Filed Dec. 30, 1964

3 Sheets-Sheet 2

United States Patent Office 3,351,915

Patented Nov. 7, 1967

3,351,915

MASK GENERATING CIRCUIT

Benjamin T. Fought, Columbus, Ohio, William B. Macurdy, Fair Haven, N.J., and David Muir III, Columbus, Ohio, assignors to Bell Telephone Laboratories, Incorporated, New York, N.Y., a corporation of New York Filed Dec. 30, 1964, Ser. No. 422,247
12 Claims. (Cl. 340—172.5)

ABSTRACT OF THE DISCLOSURE

Adjacent bit masks for a data processing system are specified in the form of signals identifying the beginning and ending bit positions of the mask. A logic circuit containing multiple coincidence gates translates the bit position defining signals into signals controlling gates in all bit positions of a bit-parallel mask circuit.

This invention relates to a bias signal generating circuit; and, more particularly, it relates to a circuit for simultaneously generating on a plurality of control circuits a selectable one of a plurality of patterns of bias signals in response to densely coded input signals. Dense coding here signifies coding with a number of bits which is smaller than the number of signals, or bits, in the bias signal pattern.

In the course of the manipulation of information in data processing machines it is often convenient to consider information characters which include a fewer number of bits than are normally included in a full processing machine word. In order that operations may be directed solely to the character bits of interest, some form of masking is utilized to exclude from condsireation all word bits except the character bits of interest. In prior art data processing machines there are a number of mask generating procedures, and they are adapted for utilization in connection with plural types of masks. However, in certain data processing applications the most frequently used maska are those of the adjacent-bit type, i.e., masks which pass information bits that are all in adjacent bit positions with respect to one another. Such adjacent bit positions are often designated as a group as the mask "window." Alternatively, it is often convenient to utilize the complement of an adjacent-bit mask to pass information in all positions except those in the mask window.

In one of the prior art methods for making masks available, the full word mask is generated and stored in a memory location which is one of many similar locations dedicated to the storage of masks. The programmer specifies the exact bit by bit configuration of the mask in his program and such specification is then converted to binary form and stored during the program assembly processes. For example, in one data processing machine a pseudo operation called OCT is employed to specify a 36-bit mask in terms of 12 octal digits and the assembly program of the machine employs the usual octal-to-binary translation to generate and store the mask in binary form. Then, when the mask is to be used, its location is addressed and read out to a particular register from which the mask may be utilized for a data processing operation. Such prior art techniques are cumbersome and they require considerable storage capacity in the memory of the processing machine. It can also be rather annoying to the programmer to be continually specifying mask make-up detail. For example, in a machine with only a 20-bit processing word there are literally hundreds of adjacent-bit mask windows of various sizes and in various positions in the 20-bit word.

Certain other circuit arrangements have been devised for representing adjacent-bit masks in densely coded form but extensive amounts of hardware are required.

It is, therefore, one object of the present invention to facilitate masking in data processing machines.

Another object is to simplify the generation of bias signal patterns in plural electric circuits.

A further object is to reduce the circuitry required for deriving mask control signals from a densely coded form of mask specification.

These and other objects of the invention are realized in an illustrative embodiment in a data processing machine in which multibit information words are processed. Adjacent-bit masks are specified in a densely coded form which is used to generate two marking signals that indicate the beginning and ending bit positions of the mask window. A unique logic circuit then translates the two signals into a plurality of bias control signals which are equal in number to the bits in a data processing machine word. The latter control signals are utilized to control masking gates in an information transmission path in the data processing machne. The logic circuit includes at least one unit comprising plural NAND circuits arranged with plural input and output circuits in ordered numerical significance. A first marking signal on one input connection produces a predetermined bias condition on a corresponding first output connection. The condition is propagated by the NAND circuits to outputs of higher significance. A second marking signal on another input connection terminates the propagation of the condition at a corresponding second output connection, and all of the affected output circuits between the two connections remain in the mentioned condition as long as the input marking signals are maintained.

It is one feature of the invention that plural logic circuit units are connectable together to operate as a single circuit with increased numbers of inputs and outputs but still only two input marking signals for the entire array.

A further feature is that the mask generating circuit is built around a basic logic circuit unit which can be used in any desired number to accommodate any desired processing machine word size.

A further feature is that the mask generating logic is basically combinational in character in that it responds to at least two arguments for generating the mask control signals and the mask is removed by removing the mask-defining input arguments from such logic circuits.

Still another feature is that the mask generating circuit includes decoder-controlled gates for converting the circuit to produce a mask complement.

Another important feature of the invention is that the programmer specifies the bit width of the mask and the number of bits of displacement of the mask window from a predetermined reference position, but no mask is generated until the particular machine instruction which includes the mask is fetched from storage for execution. Accordingly, it is not necessary to dedicate entire memory locations for the storage of such masks.

A complete understanding of the invention and its various features, objects, and advantages may be obtained from a consideration of the following detailed description of one embodiment thereof in connection with the appended claims and the attached drawing in which:

Figure 1:
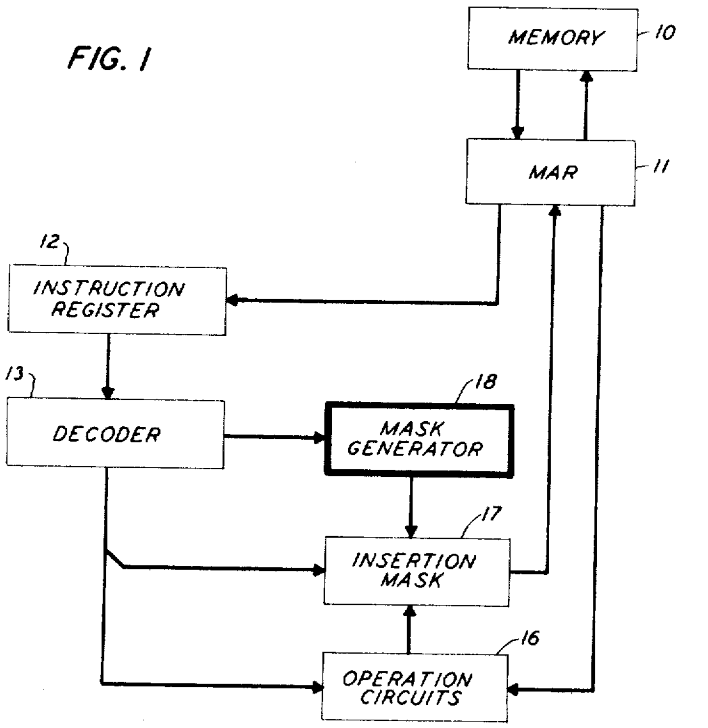
FIG. 1 is a simplified block and line diagram of a data processing machine utilizing the invention.

In FIG. 1 the invention is illustrated in a data processing machine environment. The data processing machine is indicated in only the barest outline since the details thereof are not necessary either to the understanding or the utilization of the present invention. A more complete disclosure of a processor of the type may be found in the concurrently filed application Ser. No. 422,313, filed Dec. 30, 1964, of A. W. Kettley, W. B. Macurdy, D. Muir III, and U. K. Stagg. That application is entitled, "Data Processor Control Utilizing Tandem Signal Operations" A memory 10 provides storage capacity in addressable locations for information words representing both instructions for the data processing machine illustrated and data bits utilized in the processing operations. Memory access register 11 is provided in the usual manner as temporary buffer storage for information words which have been read out of memory 10 or are to be written into memory 10.

Instructions are moved from the register 11 to an instruction register 12 where they are retained as long as required during the execution thereof in the data processing machine. The contents of instruction register 12 are utilized to control an instruction decoder 13 in the usual manner.

Data from register 11 is applied to operation circuits 16. These circuits in a typical data processing machine include the hardware needed for data and address manipulation. For example, the operation circuits 16 may involve arithmetic circuits, logical operation circuits, and other arrangements for indexing addresses and incrementing indices and addresses. Operation circuits 16 are controlled by outputs from decoder 13 in accordance with an instruction in register 12. Upon the completion of an operation in the circuits 16, one disposition of the results may be to transfer them back to the memory 10 through an insertion mask 17 and the memory access register 11.

A mask generating circuit 18 is arranged to receive control signals from the decoder 13. Those signals are utilized to generate a mask which is applied to the insertion mask 17 for use in connection with the transfer of information from the circuit 16 to the register 11 as previously mentioned. It is to be understood, however, that the mask generating circuit is useful for other applications in addition to the insertion mask application illustrated in FIG. 1.

The mask generating circuit 18 is advantageously employed for generating adjacent-bit masks of variable size and position. In utilizing this facility a programmer may, for example, wish to transfer information from the operation circuits 16 to the memory 10. He would, for this purpose, include in his program listing an instruction with the appropriate mnemonic code for such a transfer in the operation field of instruction. Many programming techniques and instruction word formats are known in the art, but one example is found in the aforementioned Kettley et al. application. The programmer would also include a designation of the particular source location of the information within operation circuit 16 and the address in memory 10 to which the information is to be transferred.

Also included in the instruction for mask generator 18 would be a designation such as "M$i$Q$j$" which would define the size and location of a desired adjacent-bit mask window. The M indicates that a mask is required, and the $i$ represents the width of the mask in terms of numbers of bits. Q indicates that the mask is displaced from a predetermined reference position such as, for example, a right-adjusted position in the data word; and $j$ indicates the number of bits of left shift required to define the position of the mask with respect to that right-adjusted position. Decoder 13 responds to the various portions of the instruction word in the usual manner known in the art. In particular, however, decoder 13 responds to the M$i$Q$j$ portion of the instruction by generating a first multibit binary coded set of signal manifestations indicating the size $i$ of the mask window, and a second set of binary coded signal manifestations representing the magnitude $j$ of the left shift.

Figure 2:
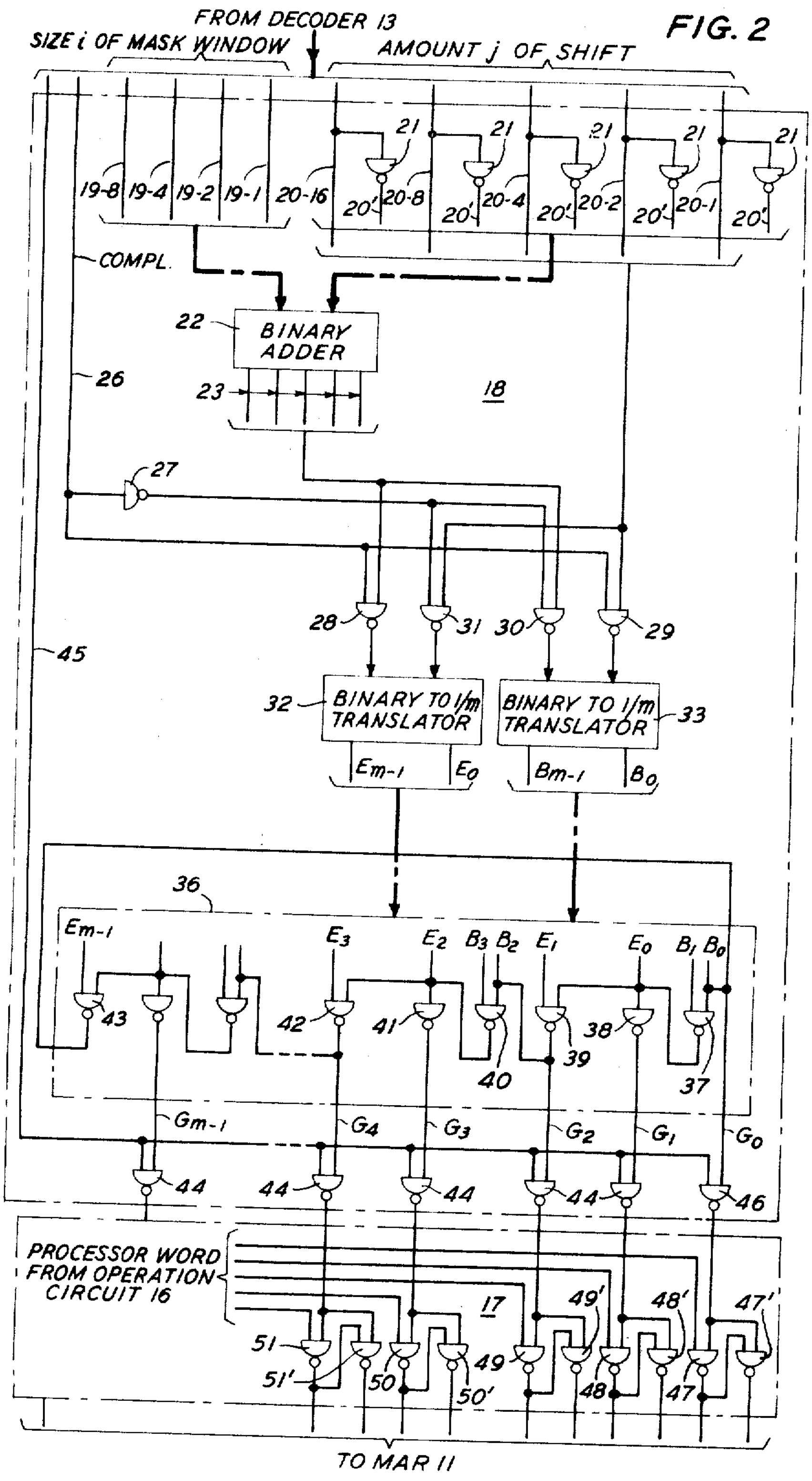
FIG. 2 is a diagram partially in block and line form and partially in schematic form illustrating the invention employed in a mask generating circuit for the data processing machine of FIG. 1.

FIG. 2 illustrates the details of the mask generating circuit 18. At the top of FIG. 2 are shown the input connections to the circuit 18 from the decoder 13. Connections 19 represent the size $i$ of the mask and the reference characters on these leads have the dash numbers -1, -2, -4 and -8, respectively, associated therewith indicating the binary code significance of each. Leads 20 are similarly represented and supplied from the decoder 13, the binary coded signals representing the amount of shift $j$ which defines the position of the mask window in a word.

Figure 3:
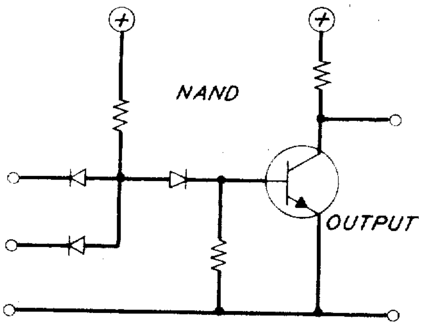
FIG. 3 is a schematic diagram of a logic circuit block employed in the circuit of FIG. 2.

Complementing NAND gates 21 are connected to each of the leads 20 so that the binary coded shift information is supplied in a double-rail logic form on leads 20 and 20'. Each of the gates 21 includes circuitry of the type illustrated in FIG. 3, which is well known in the art, and comprises input resistor-diode AND logic for coupling the effects of one or more input signals to the input of a grounded emitter transistor amplifying stage. This circuit is characterized in the form illustrated by responding to simultaneous positive input signals on all of the diode-connected input terminals to produce a low voltage, i.e., ground, at the output of the NAND circuit. In this condition the NAND gate is considered to be enabled. However, if either of those input signals is in a low voltage condition the gate is considered to be disabled, and the NAND output is driven to a high voltage condition.

The window size $i$ signals on leads 19 and the window shift $j$ signals from leads 20 and 20' are both applied to the inputs of a full binary adder 22 which produces on its output connections 23 the binary coded representation of $i+j$. Leads 20 and 23 are coupled by gates 28 through 31 to two translators 32 and 33. In order to reduce complexity in the drawing to a minimum, only a single gate is shown for each of the functions represented by gates 28 through 31, respectively. However, it is to be understood that those four gates represent schematically separate sets of gates 28 and 30 for each of the adder output leads 23, and separate sets of gates 29 and 31 for each of the shift circuits 20 defining the amount of shift $j$. Thus, when lead 26 is in its normal high voltage condition gate 28 couples the binary sum signals from adder 22 to a binary-to-one-out-of-$m$ translator 32 and gate 29 couples the shift signal circuits to a binary-to-one-out-of-$m$ translator 33. If lead 26 is biased to a low voltage condition by the decoder 13, gates 28 and 29 are disabled by lead 26 while gates 30 and 31 are enabled by gate 27 thereby interchanging the shift and sum signals to the translators 32 and 33, respectively. The purpose of this interchange will be subsequently described. The outputs of translators 32 and 33 are applied to input connections of a bias control generating circuit 36. The connections from translator 32 are designated $E_0$ through $E_{m-1}$ and the one-out-of-$m$ coding of signals on those connections define the end bit of the mask window. In translator 32 a binary input of value $n$ is arranged to mark an output lead $E_{n-1}$. The output connections of translator 33 are designated $B_0$ through $B_{m-1}$ and represent in their one-out-of-$m$ coding the beginning bit of the mask window.

The first case to be considered will be that in which lead 26 is in the high voltage condition and gates 28 and 29 are enabled. Thus, the leads $E_0$ through $E_{m-1}$ represent the sum $i+j$ in one-out-of-$m$ coding and the leads $B_0$ through $B_{m-1}$ represents the shift $j$ in one-out-of-$m$ coding. It will be noted that the beginning bit is simply the bit defined by the amount of shift $j$ from the right-adjusted position, and the ending bit for the mask window is defined by the sum of the amount of shift $j$ and the size, or width, $i$ of the mask window.

The circuit 36 includes plural NAND gates arranged in ordered sets of three gates for each set of four input circuits from the translators 32 and 33. Each such set of four input circuits includes two circuits of adjacent orders of significance from two translators respectively. For example, the gate set of the lowest significance in the circuit 36 includes NAND gates 37, 38, and 39. The $B_0$ and $B_1$ circuits are connected to two separate inputs of gate 37. The $E_0$ lead is connected to an input of gate 38 and the $E_1$ lead is connected to an input of the gate 39. Thus, in the set of four input circuits the two circuits $B_0$ and $B_1$ from the translator 33 are connected to gate 37, and the two circuits $E_0$ and $E_1$ from translator 32 are connected to the gates 38 and 39, respectively. The output of gate 37 is coupled to the aforementioned input of gate 38 to which the circuit $E_0$ is also applied, and the same output of gate 37 is also connected to an additional input of the gate 39. Thus, if leads $B_0$ and $B_1$ are both in the high voltage condition gate 37 is enabled, and its low voltage output disables gates 38 and 39 so that they are insensitive to the signals from circuits $E_0$ and $E_1$. However, if either of the circuits $B_0$ or $B_1$ is in the low voltage condition, gate 37 is disabled and its high voltage output to gates 38 and 39 leaves each of those gates responsive to signals on the circuits $E_0$ and $E_1$. Similarly, if the circuit $E_0$ is in the low voltage condition it disables both of the gates 38 and 39.

The gate operation just described can be expressed more generally in terms of Boolean expressions. Consider the set of gates 37 through 39 as illustrated with four input connections $B_n$, $B_{n+1}$, $E_n$, and $E_{n+1}$ and two output connections $G_n$ and $G_{n+1}$. The gates also have a connection $C_{n+1}$ to a more significant set of similar gates. The subscripting as a function of $n$ represents relative orders of significance. Assuming that same set of gates, i.e., gates 37–39, to have no crosscoupling connections from a lower order set, the expressions for the outputs in terms of the inputs are:

$$G_n=B_n$$
$$G_{n+1}=B_nB_{n+1}+\overline{E_n}$$
$$C_{n+1}=B_nB_{n+1}+\overline{E_n}+\overline{E_{n+1}}$$

Now consider the same set with a crosscoupling connection $C_{n-1}$ from the next lower ordered set of gates. The $B_n$, $C_{n-1}$, and $G_n$ connections are all made at a common junction for a particular set of gates, and the $B_n$ lead for the gates 37 through 39 in FIG. 2 is the $B_0$ lead. Then the expressions for the outputs in terms of the input conditions are:

$$G_n=C_{n-1}B_n$$
$$G_{n+1}=C_{n-1}B_nB_{n+1}+\overline{E_n}$$
$$C_{n+1}=C_{n-1}B_nB_{n+1}+\overline{E_n}+\overline{E_{n+1}}$$

An additional set of gates 40, 41, and 42 in the circuit 36 receives the translator circuits $B_2$ and $B_3$ and $E_2$ and $E_3$ in accordance with the same patterns described for gates 37 through 39. The output of gate 39 is coupled to the input lead $B_2$ on the gate 40 in the set of gates 40 through 42 which is of next higher order of significance in the circuit 36. If gate 39 is enabled, gate 40 is necessarily disabled and is nonresponsive to signals on circuits $B_2$ and $B_3$. Additional sets of gates of successively higher orders of significance are included in the circuit 36 and coupled to one another in the same fashion to accommodate the circuits from the translators 32 and 33. Gate 43 represents the third gate of the set of highest order of significance receiving the input circuit $E_{m-1}$ from the translator 32. For purposes of discussion the circuit of FIG. 2 is assumed to accommodate a twenty bit processor word for masking. Thus $E_{m-1}$ is $E_{19}$ in that case; and the output of gate 43, which would otherwise provide a twenty-first output is used only in the generation of a mask complement as will be subsequently described.

In each set of gates the outputs of the second and third gates of the set, e.g., gates 38 and 39 of the set 37 through 39, are utilized as output connections for the bias control generating circuit 36. Thus, the output circuit $G_1$ is supplied by the gate 38, $G_2$ by the gate 39, and $G_3$ and $G_4$ by the gates 41 and 42. Outputs $G_0$ and $G_{m-1}$ are provided with $G_{m-1}$ being $G_{19}$ for the 20-bit example under consideration. The $G_0$ output of the circuit 36 is supplied from the $B_0$ lead. Gates 44 and 46 in the outputs of the circuit 36 are controlled by a decoder output on lead 45 and comprise a part of decoder-controlled selection gating in a processor for selecting one of several possible sources of insertion mask defining control signals for mask circuit 17. For the purposes of the present invention description it is assumed that at all times a high voltage enabling signal is present on lead 45.

In the one-out-of-$m$ type of coding of translators 32 and 33 the single lead which is marked to indicate a particular bit position as already described, is in the low voltage condition and all other output leads of the same translator are in the high voltage condition. The circuit 36 responds to these signals to produce on the leads $G_0$ through $G_{m-1}$ bias control signals that are in the low voltage condition within the mask window and in the high voltage condition outside of the window.

Signals on the G-leads are applied through gates 44 and 46 to gates 47 through 51 and 47′ through 51′ in the insertion mask circuit 17. The output of each gate 47–51 is applied to an input of its corresponding gate 47′–51′, respectively, to provide double-rail logic output from circuit 17 to control register 11. Additional gates are also provided for other bit positions in the mask circuit 17, but these have not been shown in order to avoid unnecessary complication of the drawing. The aforementioned signals on the G-leads, after passing through gates 44 and 46, appear at inputs to gates 47–51 in mask 17 as high voltages within the window to enable corresponding ones of mask gates 47–51 to permit the transmission of signals through such gates from the operation circuit 16 to the memory access register 11. Similarly, low voltages from gates 44 and 46 outside the window disable the other ones of mask gates 47–51.

Assume, for example, that the translator leads $B_1$ and $E_2$ are marked with low voltage to define a mask which is shifted one bit to the left of the right-adjusted position and which is two bits in width. The $B_1$ lead thus disables the gate 37 and the $E_2$ lead disables the gates 41 and 42. However, since all other B-leads are in the high voltage condition, the $B_0$ and $G_0$ leads are also in the high voltage condition. The signal on the $G_0$ lead completes the enablement of gate 46. The output of gate 46 is a low voltage disabling signal to the gates 47 and 47′, thereby masking out the least significant bit position in the mask circuit 17.

Since the gate 37 was disabled by the signal on lead $B_1$, its high voltage output has no effect upon the gates 38 and 39. The unmarked $E_0$ and $E_1$ leads are both in the high voltage condition and complete the enablement of those gates so that the outputs $G_1$ and $G_2$ are both in the low voltage condition. Two of the gates 44 invert the $G_1$ and $G_2$ outputs to enable the gates 48 and 48′ and 49 and 49′ in the mask circuit 17. The low voltage output from gate 39 clamps the lead $B_2$ at ground thus disabling gate 40. Leads $B_2$ and $B_3$ are unmarked and in the high voltage condition, but that is of no effect because gate 40 is disabled. The high voltage output of gate 40 has no clamping effect upon the gates 41 and 42. The marked lead $E_2$ is in the low voltage condition, thereby disabling gates 41 and 42 to produce high voltage outputs on circuits $G_3$ and $G_4$. The latter outputs are inverted by two gates 44 to disable the gates 50 and 51 in mask circuit 17. The same high voltage signal on lead $G_4$ is propagated in circuit 36 to positions of higher significance for controlling the remainder of the gates, not shown, in mask 17. The result of this specific example described is that gates 48 and 49 are enabled in the mask window to pass information in the two bit positions represented thereby. The remainder of the mask gates are disabled and thereby prevent the transmission of information in those bit positions from the operation circuit 16.

If it is desired to produce the complement of a particular mask the decoder signal on lead 26 is placed in a low voltage condition. The complement of a mask will control the gates in mask circuit 17 so that information is transmitted in all bit positions except those corresponding to the bit positions in the mask window. The low signal on lead 26 disables gates 27, 28, and 29; and the output of gate 27 enables the gates 30 and 31. The sum output of leads 23 is now applied to translator 33 and the shift information on circuit 20 is applied to translator 32. A further change is required on the part of either the programmer or the assembly program for the processor. The shift for the complement must be specified as one less than the shift for the direct mask, and the mask width must be specified as two more than its counterpart. Thus $$i'=i+2$$
$$j'=j-1$$

With these changes, bias control generating circuit 36 responds to the marked and unmarked input signals in much the same fashion previously described, but the output effect produced thereby represents the mask complement.

Consider once more the previously assumed example of a two-bit window shifted to the left one bit position. Now to produce the complement, the signals on leads 19 define $i'$ as four and the signals on leads 20 and 20' define $j'$ as zero. The output of adder 22 defines the sum $i'+j'$ as four. Gates 30 and 31 cross-couple the inputs to translators 32 and 33 and cause leads $E_0$ and $B_3$ to be marked with low voltages representing $j'$ and $i'+j'$, respectively. The $E_0$ signal disables gates 38 and 39 to put high voltages on leads $G_1$ and $G_2$ which are coupled through gates 44 to disable gates 48, 48', 49, and 49' in the mask window. The $B_3$ signal disables gate 40 to produce high voltage to gates 41 and 42 for cooperating with the $E_2$ and $E_3$ signals to produce enabling signals to gates 50, 50', 51, and 51'. Succeeding gates in more significant positions in circuit 36 similarly enable corresponding gates in mask circuit 17. The low voltage output of gate 43 is coupled around as a low voltage on lead $G_0$ that is coupled by gate 46 to enable gates 47 and 47'. Thus, the mash complement blocks transmission in the window gates 48, 48', 49, and 49' and permits transmission outside the window.

Figure 4:
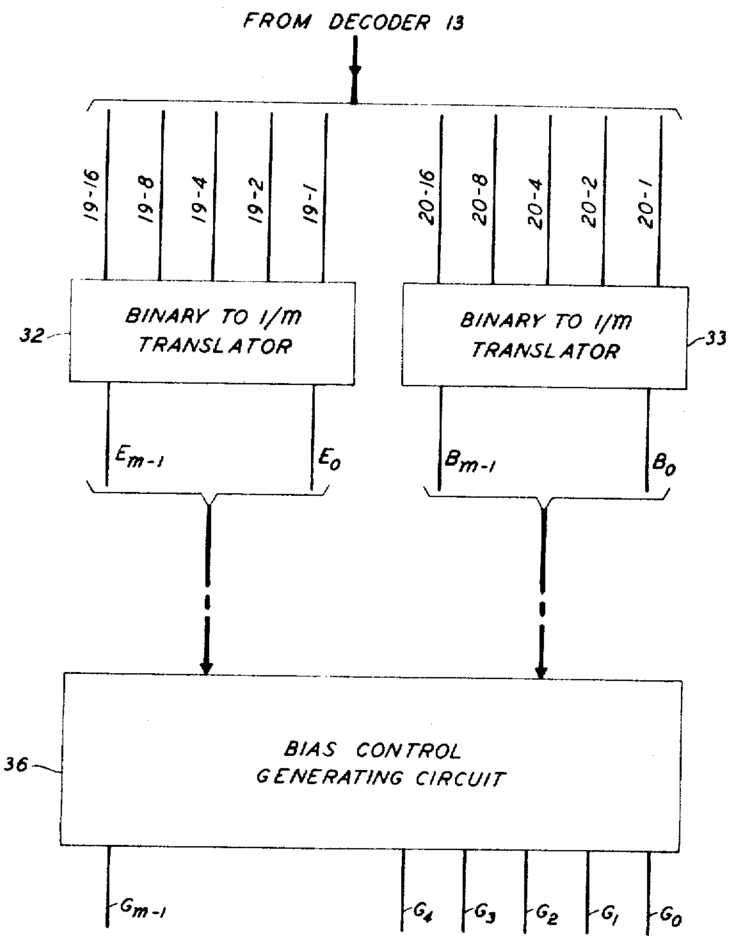
FIG. 4 is a modified mask generator circuit.

It will be recognized that certain mask complement specifications in the circuit of FIG. 2 create impossible situations insofar as the end around carry from gate 43 is concerned. The modified circuit of FIG. 4 is more flexible in those situations. In FIG. 4 the programmer specifies the beginning bit position $j$ and the end bit position $k$ directly in his instruction as E$k$Q$j$. This type of mask specifications is shown in the copending application Ser. No. 402,311, filed Oct. 7, 1964, of W. Ulrich. An extra input lead 19–16 is added from the decoder for this purpose, but no decoder lead is required to specify complementing in this case. The decoder leads 19 and 20 are applied directly to translators 32 and 33, respectively; and translator output E-leads and B-leads are applied to the circuit 36 as before. The translator 32 in FIG. 4 is arranged so that an input signal of value $n$ marks the $E_n$ output lead instead of the $E_{n-1}$ lead as in translator 32.

In the circuit of FIG. 4 a mask specified as starting in an odd bit position, e.g., $j=1$, and ending in the next lower ordered bit position, e.g. $k=0$, will mask out all bits and pass nothing. Similarly, a mask starting in an even dered bit position, e.g. $k=1$, will pass information in all positions. Apart from the special cases just enumerated, the specification of beginning and ending bit positions can produce all possible adjacent-bit masks where $k$ is greater than or equal to $j$ and all possible mask complements where k is less than $j-1$.

Figure 5:
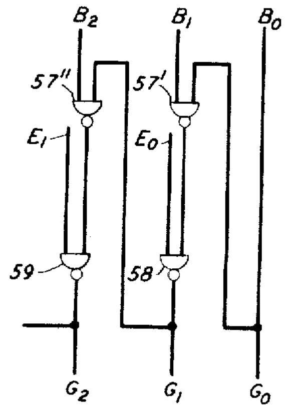
FIG. 5 is a modified form of the logic circuit of the invention.

In FIG. 5 is illustrated a modification of the bias control generating circuit 36 of FIG. 2. This circuit in FIG. 5 includes the same B leads and E leads supplying input signals thereto and it is provided with the same ordered G-leads to which output signals are supplied. The $B_0$ lead is also directly coupled through to the $G_0$ lead in the same manner as in FIG. 2. The gating arrangement coupling the other input leads to corresponding output leads differs, however, in that each of the B-leads is connected to a different gate of a first set of NAND gates instead of being connected to a first set of gates in pairs as was the case in FIG. 2. The output of each such gate in the first set is connected to a corresponding output G-lead through a different NAND gate of a second set of gates to which further control is applied from separate ones of the E-leads. Thus, the $B_1$ lead is coupled to the $G_1$ lead through NAND gates 57' and 58 in tandem, and the $B_2$ lead is similarly coupled to the $G_2$ lead through NAND gates 57'' and 59. The input leads $E_0$ and $E_1$ are applied to input circuits of gates 58 and 59 for controlling such gates in the absense of inhibit signals from the outputs of gates 57' and 57'', respectively. Other input and output leads in the generating circuit of FIG. 5 are similarly connected.

Bias conditions are propagated through the circuit of FIG. 5 by a connection to an input of each of the gates in the first set from an output G-lead of a lower order of significance. Thus, the $G_0$ output is connected to an input fo gate 57, the $G_1$ output is connected to an input of gate 57'', et cetera. The results produced by the circuit of FIG. 5 are essentially the same as those produced by the circuit 36 in FIG. 2 in that the marking of one B-lead and one E-lead of higher order than the B-lead causes similar marking signals to pair on the G output leads of the same orders of significance as the two marked input leads as well as all intermediate G output leads.

Although the present invention has been described with respect to its application in a particular embodiment, it will be apparent to those skilled in the art that additional applications and embodiments are possible and such modifications are included within the spirit and scope of the invention.

What is claimed is:

1. A signal translating circuit comprising a first group of $m$ input circuits of ordered significance for representing information in a $1/m$ code, a second group of $m$ input circuits of ordered significance for representing information in a $1/m$ code, a plurality of NAND logic gates arranged in ordered sets of three gates for every four of said input circuits, such four input circuits to each set of gates including two corresponding circuits of adjacent orders of significance from each of said groups, in each set of said gates the two input circuits of said first group being connected to different inputs of a first one of said three gates and the two input circuits of said second group being connected to an input of a different one, respectively, of second and third ones of said three gates, said translating circuit having a plurality of output circuits, two different ones of such output circuits being connected to each of said sets of gates, such output circuits for each set of gates being connected respectively to an output of said second gate and an output of said third gate, and means coupling the output of said first gate to inputs of said second and third gates, means coupling an additional one of said output circuits of said translating circuit to the lowest ordered one of said two input circuits of said first group in the lowest ordered one of said sets, and means connecting said third gate output of each of said sets to said lowest ordered one input of the set of next higher order of significance.

2. In a data processing machine a bias generating circuit comprising three logical NAND gates each of which is enabled if all input connections thereto are biased to a first voltage condition for producing an output of a second voltage condition and is disabled if any input connection is in said second voltage condition to thereby produce at the output of said gate said first voltage condition, four input connections, means biasing no more than two of said input connections to said second condition, a first one of said gates having two input circuits connected to first and second ones of said input connections and having an output circuit connected to an input of each of a second and third ones of said gates, a second one of said gates having an input circuit connected to a third one of said input connections and to said first gate output circuit, a third one of said gates having two input circuits connected respectively to a fourth one of said input connections and to said first gate output circuit, and three output connections, one to each of said first input connection and the outputs of said second and third gates, respectively.

3. In a programmed data processing machine wherein a series of stored program instructions specify a desired sequence of machine operations, said instructions being stored in a processing machine memory, decoder means decode said instructions in said sequence for producing signals to control the operation of said machine, and signal circuit masking means for bit-parallel masking are provided, the improvement which comprises said decoder means signals including first signals specifying the size of an adjacent-bit mask window and second signals specifying the magnitude of shift of such window from a right-adjusted position, and means responsive to said decoder means first and second signals controlling said masking means to provide a bit-parallel mask window of the size and at the position specified by such decoder first and second signals.

4. The data processing machine in accordance with claim 3 in which said controlling means comprises means computing the sum of said window size and said window shift signals, and means responsive to said sum and to said shift signals controlling said masking means.

5. A data processing machine comprising an instruction decoder, means supplying to said decoder machine instructions specifying the size and position of an adjacent-bit mask window, said decoder producing output signals representing in binary coded form on a plurality of output circuits the bit magnitude of said window and the bit magnitude of shift defining said window position with respect to a right-adjusted position, a binary adder computing the sum of said window magnitude and shift signals, translating means separately converting said shift signals and the output signals of said adder into separate one-out-of-$m$ signal representations, where $m$ is the number of bits in a processing machine word, for defining the bit positions in a processing machine word corresponding to the beginning and ending bits of said mask window, masking circuit means, and means responsive to said one-out-of-$m$ coded signals defining said mask window for controlling said masking means to pass signals in only those bit positions included in said window.

6. A data processing machine comprising an instruction decoder, means supplying to said decoder machine instructions specifying the size and position of an adjacent-bit mask window, said decoder producing output signals representing in binary coded form on a plurality of output circuits the bit magnitude of said windows and the bit magnitude of shift defining said window position with respect to a right-adjusted position, a binary adder computing the sum of said window magnitude and shift signals, translating means separately converting said shift signals and the output signals of said adder into first and second groups of one-out-of-$m$ signal representations, such representations appearing on corresponding first and second groups of translating means output circuits, where $m$ is the number of bits in a processing machine word, for defining the bit positions in a processing machine word corresponding to the beginning and ending bits of said mask window, masking circuit means, means responsive to said one-out-of-$m$ coded signals defining said mask window for controlling said masking means to pass signals in only those bit positions included in said window, said mask controlling means comprising a plurality of NAND logic gates arranged in ordered sets of three gates for every four of said translating means-output circuits, such four output circuits to each set of gates including two corresponding circuits of adjacent orders of significance from each of said first and second groups of translating means output circuits, in each set of said gates the two output circuits of said first output circuit group being connected to different inputs of a first one of said three gates and the two output circuits of said second output circuit group being connected to an input of a different one, respectively, of second and third ones of said three gates, two different controlling means output circuits connected to each of said sets of gate, such controlling means output circuits for each set of gates being connected respectively to an output of said second gate and an output of said third gate, means coupling the output of said first gate to inputs of said second and third gates, means coupling an additional output of said controlling means to the lowest ordered one of said two output circuits of said first output circuit in the lowest ordered one of said sets, and means connecting said third gate output of each of said sets to the lowest ordered one output circuit of said two output circuits of said first output circuit group in the gate set of next higher order of significance.

7. The data processing machine in accordance with claim 6 wherein means responsive to a further output from said decoder interchanging the sum and shift input connections to said one-out-of-$m$ code converting means, and means also responsive to said further decoder output coupling an output of said third gate of the most significant one of said sets of gates to said one input of said first gate in the least significant set of said gates.

8. In a data processing machine, a translating circuit comprising a first set of input connections arranged in ordered numerical significance, a first set of gating means arranged in ordered significance and wherein each gating means has input circuits connected to said input connections, plural output connections arranged in ordered numerical significance with the least significant one of said output connections being connected to the least significant one of said input connections, means applying input signals to said first set of input connections for enabling all of said gating means except one, a second set of gating means with input circuits thereof coupled to the outputs of said first set of gating means whereby each of said first set of gating means except said one gating means supplies an inhibiting signal to all of said second gating means to which it is connected, a second set of input connections each being coupled to an input circuit of a different gating means of said second set of gating means for controlling said second gating means in the absence of an inhibiting signal from said first set of gating means, and means coupling an input circuit of each of said first gating means except the least significant one thereof to receive an output of a gating means of said second set of gating means which is of lower significance.

9. The data processing machine in accordance with claim 8 in which said first set of gating means comprises a separate NAND gate for each of said first set of input connections except the least significant one of such input connections, and said second set of gating means comprises a separate NAND gate coupling the output of each gate in said first set to a corresponding one of said output connections.

10. The data processing machine in accordance with claim 8 in which said first set of gating means comprises a separate NAND gate for each successive pair of said first set of input connections in said ordered arrangement, said second set of gating means comprises a separate NAND gate coupling each of said second set of input connections to a corresponding one of said output connections, and a connection is provided from the output of each NAND gate of said first set to inputs of two NAND gates of said second set which are of the same order of significance as the inputs to such first set NAND gate.

11. A signal translating circuit comprising a first set of input connections B, a second set of input connections E, means marking one connection in each of said first and second sets with an input signal, a set of output connections G, all of said connections B, E, and G being assigned in their respective sets different orders of numerical significance, a further output connection $C_{n+1}$, and logic circuit means connected to said input and output connections for coupling said input marking signals to said output connections in accordance with the rule of operation, expressed in Boolean terms, $$G_n = B_n$$
$$G_{n+1} = B_n B_{n+1} + \overline{E_n}$$
$$C_{n+1} = B_n B_{n+1} + \overline{E_n} + \overline{E_{n+1}}$$

wherein the subscripting as a function of $n$ indicates relative orders of significance.

12. A signal translating circuit comprising a first set of input connections B, a sceond set of input connections E, means marking one connection in each of said first and second sets with an input signal, a set of output connections G, all of said connections B, E, and G being assigned in their respective sets different orders of numerical significance, logic circuit means comprising plural sets of logic gates connected to different ones of said input and output connections for coupling said input marking signals to corresponding ones of said output circuits and for propagating corresponding signal conditions said output circuits of intervening orders of significance, said sets of gates being assigned different orders of numerical significance corresponding to the significance of said input and output connections thereto, means $C_{n-1}$ in said logic circuit means coupling each of said sets of gates to the set of next lower order of significance, means $C_{n+1}$ in said logic circuit means coupling each of said sets of gates to the set of next higher significance, and each of said sets of gates operating in accordance with the rules, expressed in Boolean algebra terms, $$G_n = C_{n-1} B_n$$
$$G_{n+1} = C_{n-1} B_n B_{n+1} + \overline{E_n}$$
$$C_{n+1} = C_{n-1} B_n B_{n+1} + \overline{E_n} + \overline{E_{n+1}}$$

wherein subscripting as a function of $n$ indicates relative orders of significance.

References Cited

UNITED STATES PATENTS

| | | | |
|---|---|---|---|
| 3,134,091 | 5/1964 | Shugart | 340—172.5 |
| 3,251,037 | 5/1966 | Coil et al. | 340—172.5 |

ROBERT C. BAILEY, *Primary Examiner.*

J. P. VANDENBURG, *Assistant Examiner.*